United States Patent [19]
Massie

[11] Patent Number: 5,409,356
[45] Date of Patent: Apr. 25, 1995

[54] WELL PUMPING SYSTEM WITH LINEAR INDUCTION MOTOR DEVICE

[76] Inventor: Lewis E. Massie, 2218 13th St., Olivenhain, Calif. 92024

[21] Appl. No.: 897,029

[22] Filed: Jun. 11, 1992

[51] Int. Cl.⁶ .................. F16H 21/44; F04B 17/04
[52] U.S. Cl. .................................. 417/416; 74/110
[58] Field of Search ........................ 417/416; 74/110

[56] References Cited

U.S. PATENT DOCUMENTS

| | | | |
|---|---|---|---|
| 2,702,655 | 2/1955 | Lopata | 417/416 X |
| 3,175,513 | 3/1965 | Dulaney | 74/110 X |
| 4,092,554 | 5/1978 | Quinn | 310/13 |
| 4,418,609 | 12/1983 | Wickline et al. | 74/110 X |
| 4,461,187 | 7/1984 | Stanton | 74/41 |
| 4,731,569 | 3/1988 | Bohn | 318/687 |
| 4,913,677 | 6/1990 | Heidelberg | 310/12 |
| 4,997,346 | 3/1991 | Bohon | 417/319 |

Primary Examiner—Richard E. Gluck
Attorney, Agent, or Firm—Lewis E. Massie

[57] ABSTRACT

Fluid wells, particularly oil wells, exert heavy shock loads on the string of sucker rods extending down to the fluid pump located adjacent to the producing formation. A conventional rocker arm must lift the sucker rods the column of oil in the casing plus the weight of the fluid pump, overcome the inertial load and then come to a stop before reversing the stroke. The employment of linear induction motors to reciprocate the oil well rocker arm and then operate as a generator on the reverse stroke reduces the shock loading and the returns the generated electrical energy to the well pumping system. The instant invention greatly reduces the maintenance costs of a conventional oil well and provides greater efficiency of the well pumping system.

2 Claims, 1 Drawing Sheet

U.S. Patent　　　　　Apr. 25, 1995　　　　　5,409,356
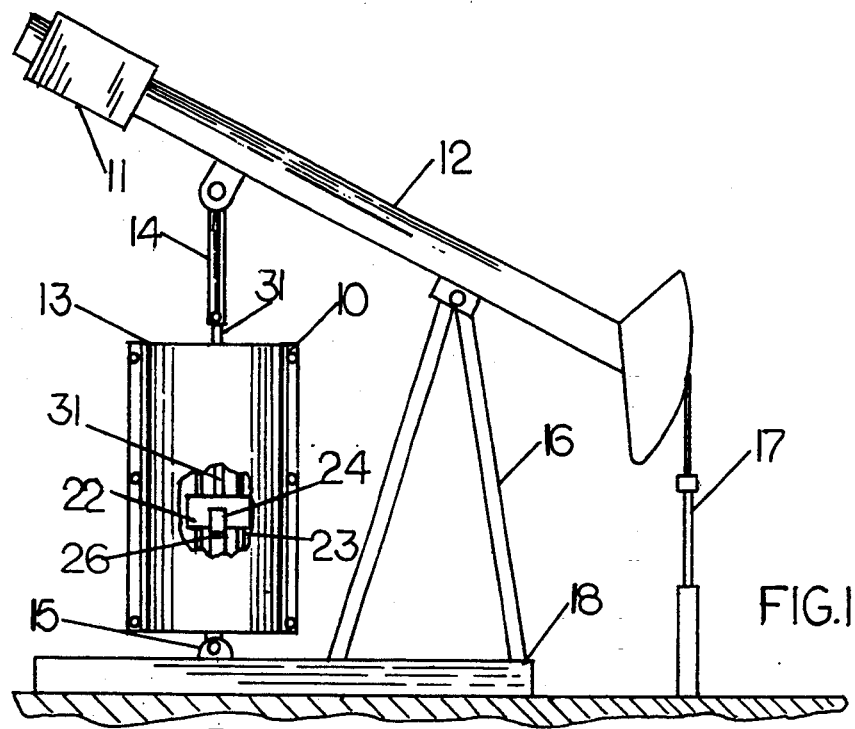
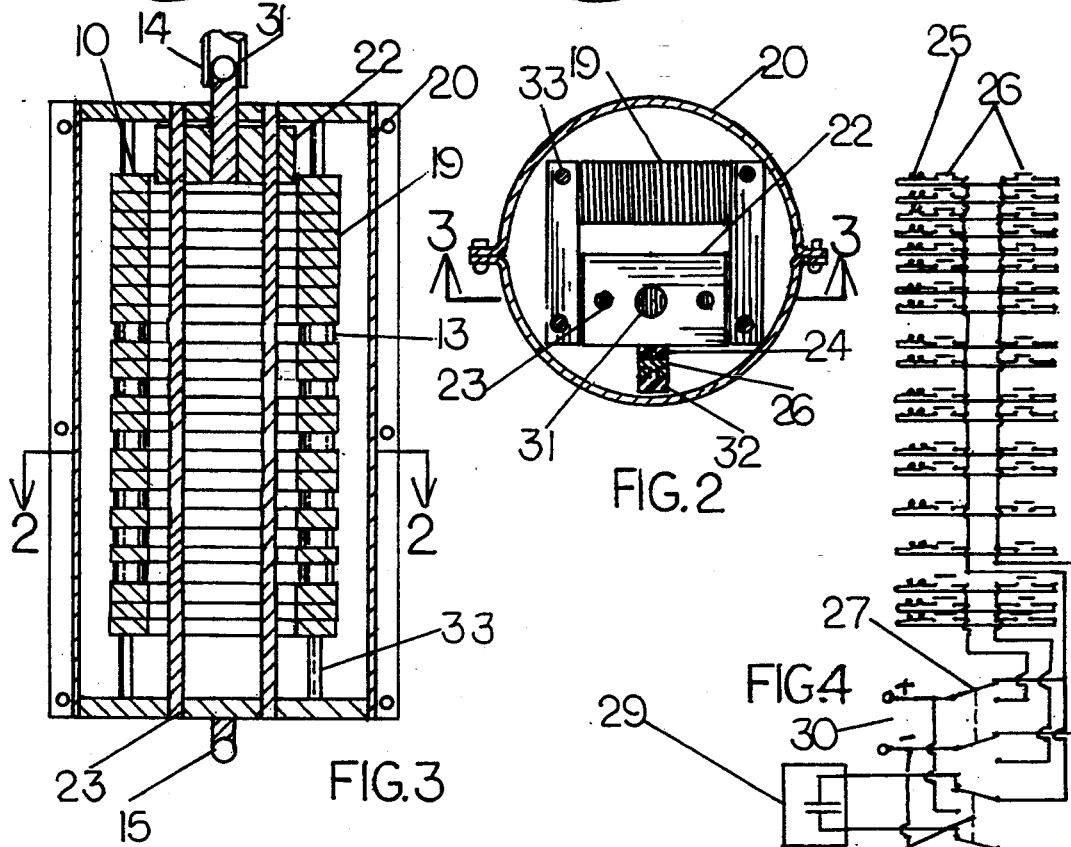
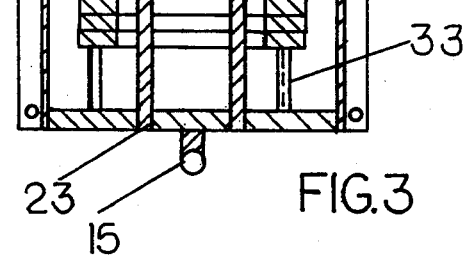
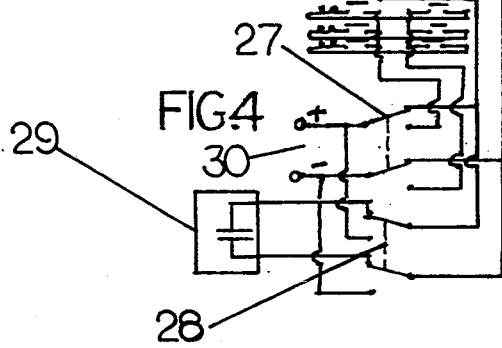

WELL PUMPING SYSTEM WITH LINEAR INDUCTION MOTOR DEVICE

BACKGROUND OF THE INVENTION

1. Field of the Invention

Reciprocating down hole pumps are known for lifting fluids from wells. The reciprocating pump is located in the well casing in the area adjacent to the producing formation. The pump is actuated by a string of sucker rods extending to the surface. The sucker rod string is typically reciprocated by a surface "pumping unit" comprising a rocker arm that is rocked about a pivot mounted intermediate its ends on a vertical support structure by a Pitman rod driven by a prime mover. Usually, a counter weight is mounted upon the opposed limb of the rocker arm (hereinafter referred to as the "drive limb") to counter-balance the weight of the sucker rods and the piston of the pump. To pivot the rocker arm and thus to reciprocate the string of sucker rods vertically within the well, the upper end of a Pitman rod is fastened to the drive limb of the rocker arm. The lower end of this rod is driven by a rotating shaft from a gear box driven by the prime mover.

As applied to a typical oil well, the load on the prime mover is at a maximum when the rocker arm begins the upwardly movement of the suspended sucker rods. This load includes the weight of the sucker rods, the weight of the oil to be lifted and the force needed to overcome the inertia of the load. At this point the constant load permits the sucker rods to reach a constant velocity until the sucker rods approach the top limit of the pumping stroke and the upwardly movement ceases and the down stroke begins. The weight of the sucker rods accelerates the downwardly movement of the rocker arm until the sucker rods reach the bottom of the down stroke at which time the pumping cycle is repeated.

The loads imposed upon the sucker rods of an oil well pump jack are considerable. During the upstroke of a typical 5000 foot (1524 m.) well the weight of the sucker rods and the oil being lifted is approximately eight thousand pounds (2639 kg). The shock loadings placed upon the sucker rod as the sucker rod motion is reversed is considerable. The acceleration of the sucker rods is at a maximum at the extremities and the result can cause fractures thereof and resulting costly repairs of the sucker rods. The instant well pumping system reduces these shock loading and associated problems by employing a linear induction motor which imposes a maximum starting force on the sucker to overcome the inertia followed by a reduced force to overcome the needed lifting force for continuing the stroke and a braking force to decelerate the movement of the sucker rods until the top of the stroke. At the top of the stroke the weight of the sucker rods accelerates the downward movement of the sucker rods and the pump piston. At this point the induction motor is switched to operate as a generator, the output of which is used to charge a battery, or capacitor, this energy is either returned to the power supply or fed into the system for the next pumping stroke. Conventional counter-weights attached to the walking beam reduce the load required for the pumping stroke.

2. Description of the Related Art

A review of the related art discloses many proposed improvements in fluid pumps for reducing the shock loadings experienced by sucker rods reversing their motion. U.S. Pat. No. 4,461,187 Stanton, 1984, discloses a pump jack comprising a rocker arm one end of which is fixed to the upper end of a sucker rod. The other limb of the rocker arm has rigidly affixed thereto a downwardly extending drive support member and a large driven pinion is eccentrically and rotatably mounted at the lower end of this drive support member. This drive arrangement reduces the acceleration and shock loadings imposed upon the sucker rods at the beginning of the up stroke. U.S. Pat. No. 4,703,655 Thompson, 1987, discloses a pumping unit with a short base frame and interchangeable crank arm while retaining a relatively low net peak torque requirement obtained through a slow up stroke and a faster down stroke. U.S. Pat. No. 4,931,677 Gotz Heidelberg, 1990, discloses an electromagnetic linear drive including a stator which constitutes a patch of movement for a vehicle. The linear drive is equipped with current conductors and is divided into a plurality of stator elements of equal length. A movable portion which constitutes a vehicle is preferably equipped with permanent magnets cooperating with the stat or to provide the drive.

SUMMARY OF THE INVENTION

The instant invention employs a plurality of electromagnetic linear motor stators to oscillate an oil well rocker arm around its support pivot. The linear motors comprise stators with associated electric winding, which are sequentially energized at a predetermined position of the movable position, air gap in the magnetic flux path and a movable magnetic portion movable or linear armature within said air gap. The linear motors arranged along a linear path are supported by non-magnetic bearing rods parallel to said path. The linear motors are arranged consecutively along said path either singularly or in parallel groups and adjustable vertically by spacer elements. A Pitman rod attached to the top surface of the movable magnetic portion is attached to the rocker arm drive limb for providing the required reciprocating movement. The electric windings of each stator element are connected individually to switching means placed along the path of the moving magnetic portion. A cooperating switching actuator is attached to the moving magnetic portion. The cooperating switching actuator on the moving portion interacts with the switching means to energize, or de-energize, the electric winding of the associated stator element. The switching means are either conventional commutator switching means or solid state switches.

The stator switching elements cooperating with the switch actuator means on the moving magnetic portion activate the stator windings selectively to generate a shifting magnetic field to apply full power, reduced power or reversing power input to the associated linear motor stator. Similar cooperating switching elements convert the linear motor to a linear generator at the end of the stroke. A counterweight slidably affixed to the drive limb of the rocker arm balances the weight of the sucker rods and the pump piston reducing the load on the pumping stroke.

BRIEF DESCRIPTION OF THE DRAWINGS

FIG. 1 is a partially sectioned side view of the well pumping system with linear induction motor drive;

FIG. 2 is a sectional view through 2—2 of FIG. 3;

FIG. 3 is a sectional view through 3 of FIG. 2;

FIG. 4 is an electrical wiring diagram of the well pumping system.

DETAILED DESCRIPTION OF THE PREFERRED EMBODIMENTS

The partially sectioned side elevational view of the well pumping system shown in FIG. 1 shows the rocker arm 12 pivotally mounted intermediately on the support structure 16 mounted on the pump base 18. A first end of the rocker arm is attached to the sucker rod string 17, the second, or drive limb, of the rocker arm is rotationally attached to the Pitman rod 14 which is attached to the drive rod 31 of the linear motor. The linear motor 10 is mounted intermediate the rocker arm and the base on pivotal fixture 15 mounted on the pump base 18. The vertical moving magnetic portion, or armature 22 is suggested by bearing rods 23, supporting means 24 supports switching means 26. A counterweight 11 is affixed to the second end, or drive limb, of the rocker arm.

The sectional view through 2—2 of FIG. 3 shown in FIG. 2. The stator element 19 is shown with the vertical moving magnetic portion 22 passing through the air gap of the stator 19 guided by the non-magnetic bearing rods 23, and the non-magnetic support rods 33. Attached to the vertical moving portion 22 a structure 24 is provided to support the switching means actuator 26 which actuates the switches mounted on a structure 32 along the moving path of the switching means actuator. An environmental protecting cover 20 encloses the linear motor assembly 10. The drive rod 31 connects the linear motor to the Pitman rod 14.

FIG. 3 is a sectional view through 3—3 of FIG. 2 showing the Pitman rod 14 attached to the drive rod 31 of the linear motor 10. The linear motor is mounted on the base FIG. 15 and environmentally protected by the cover 20. The moving portion 22 is supported by the non-magnetic bearing rods 23 as it slides vertically through the air gaps of the stators 19 which are supported by non-magnetic rods 33 and the selected spacers 13.

Referring to the wiring diagram of FIG. 4, the stator windings 25 are shown connected individually to switching means 26. The closing of switching means 26 by actuators means 24 energizes the associated stator winding. At the end of the lifting, or power stroke, the switching means actuator 24 operates switches 27 and 28 to convert the linear motor to a linear generator. Downward movement of the sucker rod string due to gravity generates electric power which is fed into the storage capacitor 29 for use in the succeeding power stroke.

In operation the power stroke is initiated by the closing of the switching means 26 feeding power into the windings of the first four stators. Upward movement of the magnetic portion selectively energizes the windings of the following six stators while opening the switches feeding the first four stators. As the moving magnetic portion nears the top of the stroke switching means 28 reverses the current flow to the following stators to effectively brake the upward movement of the magnetic portion to a complete stop at the end of the power stroke. Downward movement of the magnetic portion due to the weight of the sucker rod string feeds electric power into the now linear generator which is stored in the capacitor for future use.

I claim:

1. A well pumping system with linear induction motor drive wherein a rocker arm pivotally supported intermediate its ends, a first end of which is attached to a sucker rod and the second end portion attached to a base mounted linear induction motor wherein the improvement comprises:
   (a) a series of equal length, electrically activable stators arranged consecutively along a linear path;
   (b) a magnetic portion, cooperative with said stators for electrically moving a power output rod along said path;
   (c) switching means disposed along said path which are sequentially energized at a predetermined position of said magnetic portion for switching on or off, the power applied to each stator;
   (d) non-magnetic rods providing slidable support for said magnetic portion along said path;
   (e) a load support rod fastened to the top surface of said magnetic portion;
   (f) switch actuating means attached to said magnetic portion;
   (g) said switching means aligned with a switching means support structure extending the length of the assembled stators;
   (h) individual switching means electrically connected to the field winding of the associated stator, and
   (i) the spacing between consecutive stators adjustable by selected spacers to the needs for accelerating and braking the velocity of the magnetic portion.

2. The well pumping system as described in claim 1 wherein the improvements further comprise:
   (a) said linear induction motor mounted between the pump base and a pitman rod oscillates the rocker arm around its support pivot;
   (b) a downward movement of the pitman rod oscillates the rocker arm to lift the sucker rod string fastened to the first end of the rocker arm;
   (c) at the end of the upward power stroke the weight of the sucker rod string reverses the oscillation of the rocker arm until the sucker rod string is at the beginning of a power stroke;
   (d) additional switching means converts said linear motor to a generator which is driven by the weight of the descending sucker rod to provide electrical power which is stored in a capacitor, to be fed back into the power supply system of the well pumping system for use in providing power for use in the next stroke;
   (e) said additional switching means activated by the moving magnetic portion permits said linear induction motor to increase power output during the accelerating mode of the magnetic portion, reduces the operating load during the stroke and provides dynamic braking at the conclusion of the stroke, and;
   (f) a slidable counter weight mounted on the rocker arm adjacent to the pitman arm balances the weight of the sucker rod.

* * * * *